United States Patent [19]

Kalas

[11] 4,117,630

[45] Oct. 3, 1978

[54] REVOLVING PLANTER

[76] Inventor: Barbara A. Kalas, 8615 Colfax Ave. South, Minneapolis, Minn. 55420

[21] Appl. No.: 777,008

[22] Filed: Mar. 14, 1977

[51] Int. Cl.² .......................... A01G 9/02; G09F 11/00
[52] U.S. Cl. ........................................... 47/67; 185/5; 211/1.5; 248/220.2; 248/318
[58] Field of Search .............. 47/39, 67, 65; 40/53 R; 248/220.2; 185/5-7, 32; 211/1.5; 247/317, 318

[56] References Cited

U.S. PATENT DOCUMENTS

| 307,966 | 11/1884 | Lienhop | 47/39 X |
|---|---|---|---|
| 327,673 | 10/1885 | Gaillard | 47/39 X |
| 450,148 | 4/1891 | Godeffroy | 185/32 |
| 965,569 | 7/1910 | Crandon | 185/32 |
| 1,208,457 | 12/1916 | Bellville | 47/39 X |
| 2,939,330 | 6/1960 | Margetts | 47/39 X |
| 3,456,579 | 7/1969 | Woods | 99/341 |
| 3,456,762 | 7/1969 | Dinnerstein | 40/53 R |
| 3,915,419 | 10/1975 | Brown et al. | 47/67 |
| 3,981,099 | 9/1976 | Dziewulski | 47/67 |
| 4,005,843 | 2/1977 | Wengel | 47/39 X |

FOREIGN PATENT DOCUMENTS

| 8,898 of | 1885 | United Kingdom | 47/39 |
|---|---|---|---|
| 118,744 | 2/1918 | United Kingdom | 47/39 |

*Primary Examiner*—Edgar S. Burr
*Assistant Examiner*—James R. Feyrer
*Attorney, Agent, or Firm*—Frederick E. Lange

[57] ABSTRACT

A revolving hanger for a planter in which a motor is employed to revolve the hanger support. This motor is preferably a weight operated motor with suspended weights which are located in the area normally occupied by the cords supporting the planter so that the weights are relatively unobtrusive. Because of the use of a weight wound motor, it is possible for the user to readily wind the motor while standing on the floor by moving the weight to the desired elevated position for initiation of the rotation of the planter.

7 Claims, 3 Drawing Figures

REVOLVING PLANTER

BACKGROUND OF THE INVENTION

Indoor plants tend to either lean toward a source of sunlight or grow better on the side of the plant which is exposed to a source of light. Consequently, it has been quite customary in connection with plants to periodically shift the position of the plant so that different portions of the plant are exposed to sunlight. This is often done by partially rotating the plant manually every few weeks.

The problem with manually shifting the angular position of the plant is that the person taking care of the plant often tends to forget until the plant is decidedly unsymmetrical. It would obviously be desirable to have some means for periodically shifting the position of the plant automatically. Obviously, if this were done continuously, the symmetry of the plant would be maintained as much as possible.

While it is possible to turn a plant manually when the container therefor is standing on a readily accessible surface, it becomes more difficult to do so when the plant is in a planter suspended from an overhead support. Under such conditions, the only way the position of the planter can be shifted is to remove the plant from the hook of the hanger and to relocate it. Since such planters are customarily suspended by a limited number of cords or similar flexible supporting members, the number of angular positions in which the planter can be placed upon the hanger are relatively limited in number. Furthermore, such hangers are in relatively elevated positions and often it is necessary to climb on a stepstool or chair to gain access to the hook of the hanger in order to shift the plant. As a result, such planters tend to remain in the same angular position until they become obviously very unsymmetrical.

SUMMARY OF THE PRESENT INVENTION

The present invention is concerned with a hanger for a planter in which there is a support for suspending the planter and in which this support is slowly revolved with respect to the supporting means for the hanger by a motor so that different angular portions of the planter are progressively exposed to the source of light such as a window.

The motor preferably takes the form of a clockwork motor which is designed to operate the output shaft at a relatively uniform speed to cause uniform rotation of the planter.

Because the support for a planter is normally at a relatively elevated height, provision is preferably made for mechanically winding the motor at a point beneath the support for the planter so that the person taking care of the plant can wind it while standing on the floor.

One suitable form of clockwork motor particularly adapted for my invention is a clockwork motor of the weight operated type in which there is a weight suspended from a flexible member which can be raised to an elevated position and which, upon descending, operates the clockwork motor. A typical movement of this type is that normally employed in cuckoo clocks. While a separate weight is normally employed for operating the motor, the planter itself may be employed as the weight by suspending the planter from the flexible member.

The clockwork motor is designed so that when a separate weight is employed, the movement of the weight necessary to effect rotation of the planter over a desired period of time is less than the distance between the planter support and the normal position of the planter itself so that when the weight is in its lowermost position, it is spaced from the plant.

Because planters are normally supported by cords or similar flexible supporting members, a separate weight, if employed, tends to be disposed between such cords so that it is relatively inconspicuous and does not adversely affect the overall aesthetic effect of the planter.

The planter preferably has a housing surrounding the clockwork motor. The housing may be stationary and the hook or other planter support may be secured to the clockwork mechanism, the clockwork mechanism being effective to cause relative motion of the clockwork mechanism and hence the hook with respect to the housing.

Various other features and objects of the present invention will be apparent from a consideration of the accompanying specification, claims and drawing.

DESCRIPTION OF THE PREFERRED EMBODIMENT

Figure 1:
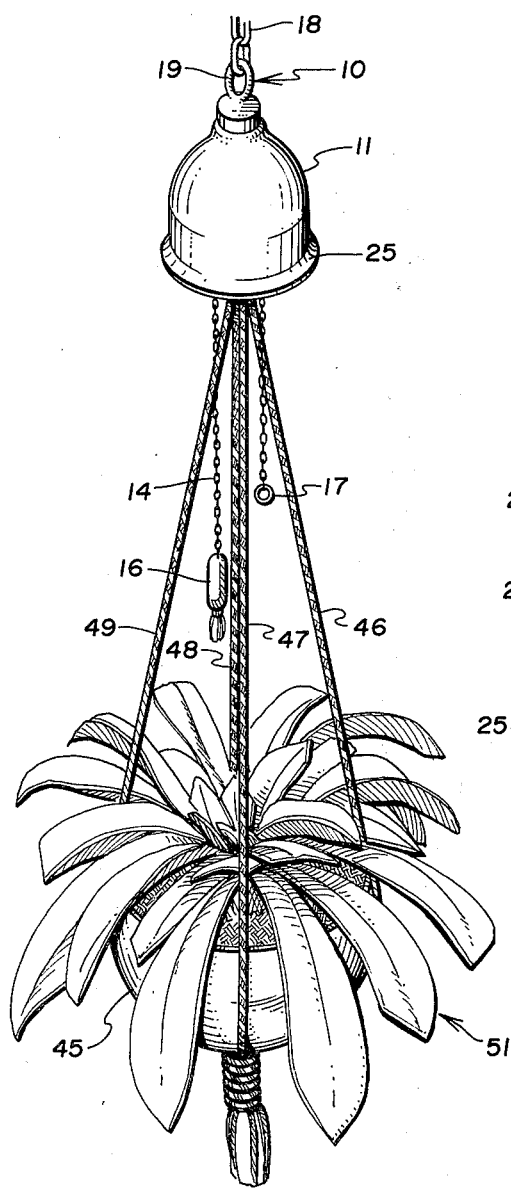
FIG. 1 is a perspective view of my improved hanger with a planter suspended therefrom.
Figure 2:
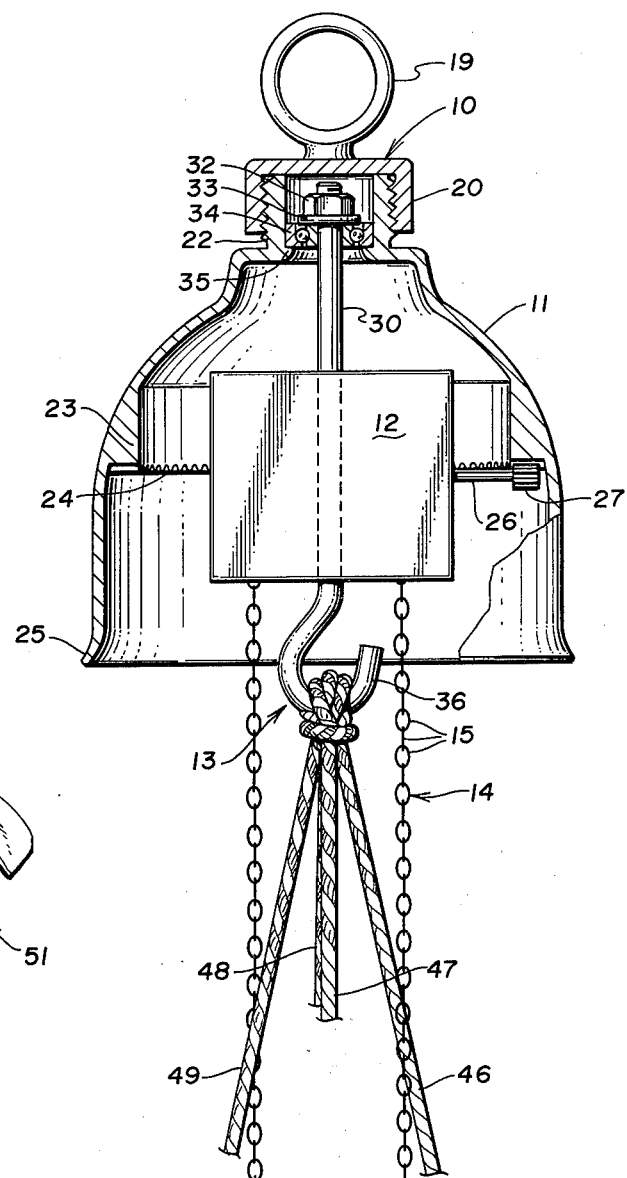
FIG. 2 is a vertical sectional view of my planter with the clockwork mechanism for actuating the same shown in side elevation.

Referring first to FIGS. 1 and 2, it will be noted that the hanger broadly comprises a supporting member 10 adapted to be supported from a suitable support on the ceiling or wall, a housing 11, a motor 12 and a planter support 13 shown in the form of a hook. The motor 12 is preferably a clockwork motor of the weight operated type. The motor includes a chain 14 composed of a plurality of links 15, the chain, as will be described later, passing over a motor actuating wheel and having a weight 16 secured at one end thereof and a pull ring 17 secured to its opposite ends.

Referring now to the planter supporting member 10, this comprises a ring 19 which may be secured to a chain 18 (FIG. 1), the opposite end of which is secured to the ceiling or any suitable bracket extending out from the wall. The lower portion of the supporting member 10 terminates in an internally threaded collar 20 which is adapted to threadedly engage with an upstanding, externally threaded, neck portion 22 of the housing 11. Collar 20 and neck portion 22 are tightened together so that the housing 11 is held rigidly to the support member 10.

The housing 11 is flaed outwardly and terminates at its lower end in an outwardly extending lip 25. The housing is provided with an internal shoulder 23 which has annular teeth 24 extending around the underside of the shoulder to operate as a circular rack. The output shaft 26 of the motor 12 is provided with a pinion gear 27, the teeth of which mesh with the rack teeth 24. It will be obvious that as the shaft 26 is rotated, relative rotation of the motor and the housing occur. Since, as will be obvious from what has been explained, the housing 11 is held stationary, the operation of shaft 26 will cause motor 12 to rotate about a vertical axis.

Referring to the planter support 13, this support has an elongated stem 30 extending upwardly and secured to the clock motor 12. At its upper end, the stem 30 is threaded and has a nut 32 secured thereto. A washer 33 is disposed on the underside of nut 32 and rests upon a bearing 34, the lower wall of which rests upon an internal shoulder 35 of the housing 11. It will be readily apparent that the planter support 13 is journalled for motion with respect to housing 11 by reason of the structure just described, including bearing 34. At its lower end, the support member is shown as terminating in a hook 36. Any other suitable arrangement could be provided, however, for supporting the planter.

The stem 30 is shown in dotted lines in connection with the clock motor 12. It is important that the upper portion of the plant support be actually aligned with stem 30. It is also important that axle 26 be centrally disposed along a vertical center plane of the housing 11. In other words, it is desirable that the axle 26 of the output shaft of the motor 12 lie along a diameter line of the housing 11. There are several ways in which this can be accomplished. The clock motor 12 may be designed to permit the stem 30 to extend axially through the clock motor without interfering with the operation of the gears therein. Or, the stem 30 may be bent to provide a U-shaped portion into which the housing of the clock motor 12 is disposed. Or, for that matter, the support member may be formed in two pieces with the upper portion including a stem 30 being secured to the upper wall of the housing 12 and the lower portion secured to the lower wall. In any event, it will be obvious to a person skilled in the art how to mount the clock motor 12 in such a way that the longitudinal center axis of the hook 36 will be coaxial with the stem 30 and so that the output shaft 26 will lie upon a diameter line of the housing 11. Regardless of how the supporting member 13 is disposed with respect to the housing of the motor 12, it is important that they be secured together to move as a unit so that as the clock motor 12 is moved by reason of the pinion gear 27 moving along the rack 24, the support member 13 will likewise be rotated.

Referring to the motor 12, this motor is shown as being a clockwork motor of the weight operated type. While any suitable motor could be employed, it is desirable to employ a manually wound motor in order to avoid the necessity of connecting to an electrical source of supply. Such planters are usually located in positions somewhat remote from an electrical outlet and it would obviously be, not only inconvenient, but unsightly to have an extension cord extending down along the wall to the nearest electrical outlet. If a battery operated motor were employed, it would be necessary for the person taking care of the planter to periodically change batteries. This, at best, would be difficult due to the elevated location of the planter support. Thus, where a manually wound motor of the weight operated type is employed, it becomes possible to have an extremely simple mechanism which can be readily wound without the necessity of climbing onto an elevated platform such as a chair or stepstool.

Figure 3:
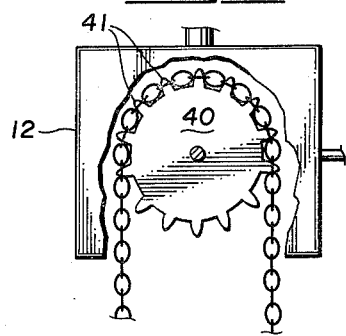
FIG. 3 is a fragmentary view with a portion broken away showing the manner in which a weight forming part of the motor is employed to actuate the motor.

The motor 12 may well be of the type commonly employed in cuckoo clocks or in other devices where it is desired to use a weight to actuate the device. The chain 14 is designed to link with a clock actuating mechanism. As shown in FIG. 3, this may take the form of a toothed wheel 40, the teeth 41 being spaced apart a distance proportional to the length of a link of the chain so that they successively engage with the teeth 41. For example, the teeth 41 may be spaced by an amount equal to the length of two links 15 so that there is a tooth 41 for every other link 15. The wheel 40 is connected through pawls to a gear which is in turn connected through suitable gearing and an escapement mechanism to the shaft 26. It is to be understood that as the weight 16 descends, the wheel 40 is rotated in a counterclockwise direction and this motion is transmitted to the output shaft 26. When it is desired to "wind" the motor, the pull ring 17 is actuated to draw the weight 16 up until it is closely adjacent to the clock motor 12. As is conventional with such an arrangement, a suitable stop is provided to limit the downward movement of the weight 16. This stop may take any suitable form. For example, the stop may be the pull ring 17 which will engage the under wall of the housing of motor 12 when the weight 16 is in its lowermost position. This stop, regardless of its form, is so located that downward movement of weight 16 will terminate when the weight is at a position corresponding to the normal position between the hook 36 and the planter suspended therefrom. The period of time in which this will take place can vary. Obviously, it is desirable to have the period of time be as long as possible, preferably at least as long as the length of time during which the sun is shining. The motor 12 is preferably provided with sufficient internal gearing that the planter support 13 will rotate very slowly. One complete revolution of the planter during the sunlight hours is all that is necessary. Because of the large gear reduction that is possible, a relatively short length of travel of the weight 16 can be employed. Also, the weight 16 may not be excessively large.

While I have shown, for clarity of illustration, the wheel 40 and the chain 14 being in a plane parallel to the shaft 26, it is to be understood that in actual practice, the wheel 40 would probably be in a plane perpendicular to the axis of shaft 26 so that the axis of shaft 26 would be parallel to the axis of wheel 40. This is the practice normally followed in connection with such weight-operated clockwork mechanisms.

As shown in FIG. 1, the planter is suspended by a plurality of cords 46, 47, 48 and 49 which are secured over the hook 36 in such a manner that they are fastened thereto. The length of the cords 46, 47, 48 and 49 are selected so that the planter does not hang unduly low so as to interfere with other activities in the room in which the planter is located. At the same time, as is customary with such planters, the length of the cords is sufficiently long to allow a fairly long travel of the weight 16 before it would come into contact with the plant in the planter. In FIG. 1, I have shown a plant 51 as being disposed within the planter.

As was indicated previously, it is possible to have the planter itself act as the weight. In such case, the hook 13 is dispensed with and the planter is suspended directly from the chain 14. The chain would be provided with a suitable hook and would be of sufficient strength to support the planter. The cords 46, 47, 48 and 49 would then be attached to this hook. This arrangement has the advantage that use is made of the substantial weight of the planter which is normaly filled with soil. It also has the advantage that the vertical position of the planter shifts somewhat, thus further varying the exposure of the plant to sunlight. It has the drawback that the vertical movement of the weight must be relatively limited since it is obviously undesirable to have the planter in too low a position, particularly when the planter support is located above a table or a work surface.

With my improved planter, regardless of the nature of the weight or regardless of the type of motor employed, the planter 45 is constantly rotating during the sunlight hours exposing the foliage of the plant equally to the sun. All that the user of the planter needs to do when a weight operated motor is employed, besides the usual care of the plant by watering and fertilizing, etc., is to grab hold of the ring 17 each morning and elevate the weight to its uppermost position. Thereafter, the plant slowly rotates at an almost imperceptible rate, completing its rotation during a period of time equal to normal daylight hours. The result is that the plant will be equally exposed on all sides to the sun and hence will be completely symmetrical. Where a weight operated motor is employed, it is possible for a user to rewind the motor relatively readily. Such is not the case, for example, if a spring wound motor is employed. With a weight operated motor, no external power source is necessary, no electrical cord is necessary, nor is it necessary to get periodic access to the housing 12 such as is the case if batteries are employed to operate the motor.

A further advantage of a weight operated motor in connection with a planter hanger is that the weight and the chain or other filamentary member connected therewith is relativey unobtrusive since the weights and the chain normally travel downwardly between the cords 46, 47, 48 and 49. In other words, because of the cords, the two ends of the chain tend to resemble two additional cords and do not particularly affect the overall aesthetic effect. Thus, it is possible to provide a readily accessible means for winding the motor without impairing the overall appearance of the planter.

It will be seen that I have provided a simple revolving hanger for a planter which will cause a planter to be continously rotated at a relatively slow speed and expose the plant equally to the sun on all sides. While I have shown a specific construction for purposes of illustration, it is to be understood that my invention is limited in scope solely by the appended claims.

I claim:

1. A revolving hanger for a planter, said hanger comprising a supporting member adapted to be supported from a suitable supporting surface,
 a housing secured to and supported from said supporting member and having a weight operated clockwork mechanism therein, said weight operated clockwork mechanism having a weight actuated chain passing over a rotary toothed clockwork actuating member with which it is coupled so that when a planter is secured to said planter support beneath said housing the gravitational force exerted by the weight as it descends will cause actuation of said clockwork mechanism and slow rotation of the planter, and
 a planter support projecting down from and beneath said housing and adapted to support a planter therefrom,
 said clockwork mechanism being designed to cause relative rotation between said supporting member and said housing to cause slow rotation of said planter support about the axis thereof and relative to said supporting surface.

2. The revolving planter hanger of claim 1 in which the weight operated clockwork mechanism includes a weight secured to one end of said chain and movable between an elevated position in which said motor is fully "wound" and a lowermost position in which the lower end of said weight is spaced from said planter support by an amount less than the normal spacing between said planter support and a planter suspended therefrom.

3. The revolving planter hanger of claim 1 in which said planter support is a hook over which cords suspending the hanger are adapted to be engaged.

4. The revolving planter hanger of claim 1 in which said housing is stationery and in which said clockwork mechanism is secured to said planter support and rotates with respect to said housing to rotate said planter support.

5. The revolving planter hanger of claim 4 in which a driven element of said clockwork mechanism is coupled through a pair of mating gear elements with said housing in such a manner as to cause rotation of said clockwork mechanism and hence said planter support.

6. The combination of a planter and a revolving hanger therefor,
 said hanger comprising a supporting member adapted to be supported from a suitable supporting surface, a housing secured to and supported from said supporting member, a clockwork mechanism in said housing, and a planter support projecting downwardly from and beneath said housing,
 said planter comprising a plant receptacle and a plurality of flexible elongated members passing beneath said receptacle and secured to said planter support,
 said clockwork mechanism being designed to cause relative rotation between said supporting member and said housing to cause slow rotation of said planter support and said planter about the axis of said support and relative to said supporting surface,
 and said clockwork mechanism having a weight operated motor for energizing said clockwork mechanism, said weight operated motor having a weight actuated flexible elongated member beneath said housing in the region of said flexible elongated members of said planter support and passing over a rotary clockwork actuating member with which it is coupled so that the gravitational force exerted by the weight as it descends will cause actuation of said clockwork mechanism and slow rotation of the planter.

7. The combination of claim 6 in which the weight operated motor includes a weight secured to one end of the flexible elongated member of said motor and movable between an elevated position in which said motor is fully "wound" and a lowermost position in which the lower end of said weight is close to but spaced from said planter and in which the lower portions of said elongated member are disposed between said flexible elongated members of said planter support.

* * * * *